United States Patent
Schnabel

(10) Patent No.: US 9,597,820 B2
(45) Date of Patent: Mar. 21, 2017

(54) METHOD FOR PRODUCING A NATURAL FIBER-REINFORCED PLASTIC PART

(71) Applicant: HIB-TRIM PART SOLUTIONS GMBH, Bruchsal (DE)

(72) Inventor: Uwe Schnabel, Bruchsal (DE)

(73) Assignee: HIB—TRIM PART SOLUTIONS GMBH, Bruchsal (DE)

( * ) Notice: Subject to any disclaimer, the term of this patent is extended or adjusted under 35 U.S.C. 154(b) by 0 days.

(21) Appl. No.: 14/739,463

(22) Filed: Jun. 15, 2015

(65) Prior Publication Data

US 2015/0367533 A1    Dec. 24, 2015

(30) Foreign Application Priority Data

Jun. 24, 2014  (DE) ........................ 10 2014 108 820

(51) Int. Cl.

| | | |
|---|---|---|
| B29B 9/14 | (2006.01) | |
| B29B 7/90 | (2006.01) | |
| B29B 7/92 | (2006.01) | |
| B29B 9/08 | (2006.01) | |
| B29C 45/00 | (2006.01) | |
| C08L 23/12 | (2006.01) | |
| B29B 9/16 | (2006.01) | |
| B29K 23/00 | (2006.01) | |
| B29K 105/08 | (2006.01) | |
| B29K 105/00 | (2006.01) | |
| B29K 311/10 | (2006.01) | |
| B29K 491/00 | (2006.01) | |

(52) U.S. Cl.

CPC ................. *B29B 9/14* (2013.01); *B29B 7/90* (2013.01); *B29B 7/92* (2013.01); *B29B 9/08* (2013.01); *B29C 45/0005* (2013.01); *C08L 23/12* (2013.01); *B29B 9/16* (2013.01); *B29C 45/0001* (2013.01); *B29C 2045/0091* (2013.01); *B29K 2023/12* (2013.01); *B29K 2105/08* (2013.01); *B29K 2105/251* (2013.01); *B29K 2311/10* (2013.01); *B29K 2491/00* (2013.01); *B29K 2995/0089* (2013.01)

(58) Field of Classification Search

CPC .... B29B 9/08; B29B 9/14; B29B 9/16; B29B 7/90; B29B 7/92; B29C 45/0001; B29C 45/0005; B29C 45/46; B29C 2045/0091; B29K 2105/08; B29K 2105/251; B29K 2023/12; B29K 2995/0089; B29K 2311/10; B29K 2491/00; C08L 23/12

See application file for complete search history.

(56) References Cited

U.S. PATENT DOCUMENTS

2011/0109013 A1 * 5/2011 Hashiba .............. B01F 7/00708
                                                         264/299
2012/0098160 A1    4/2012 Watanabe et al.

FOREIGN PATENT DOCUMENTS

DE    102008046770 A1    3/2010
DE    102011116397 A1    4/2012

OTHER PUBLICATIONS

Clariant, Waxes for Engineering Thermoplastics, 2013, p. 1-24.*

* cited by examiner

*Primary Examiner* — Robert Jones, Jr.
(74) *Attorney, Agent, or Firm* — Scully Scott Murphy and Presser; Edward Grolz

(57) ABSTRACT

The invention relates to a method for producing a natural fiber-reinforced plastic part, wherein as the starting material natural fibers 5-120 mm in length, a thermoplastic and/or a duroplastic and a lubricant, especially wax, are pelletized without extrusion into long-fiber pellets by cold-forming and the long-fiber pellets are then feed for direct processing into a standard injection molding machine for injecting the plastic part.

17 Claims, 1 Drawing Sheet

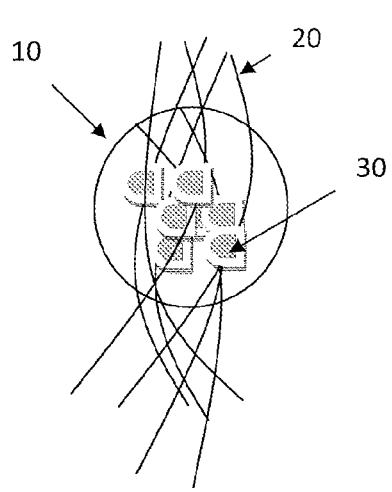
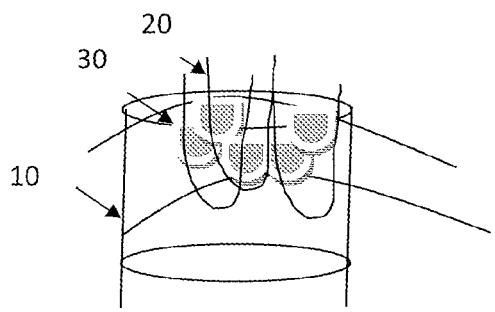
Fig. 1b
Fig. 1a
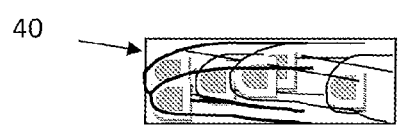
Fig. 1c

METHOD FOR PRODUCING A NATURAL FIBER-REINFORCED PLASTIC PART

The invention relates to a method for producing a natural fiber-reinforced plastic part.

Along with glass fiber-reinforced plastics, natural fiber-reinforced plastics have been known for many years and have been used in a great variety of ways. The thermoplastic natural fiber-filled granular plastic materials usually consist of a maximum of 45% short natural fibers, at least 50% of a mineral oil-based polymer or biopolymer, and up to 10% additives including 5% adhesive promoters. These components are usually hot-mixed in a separate working pass in an extruder at about 180° C., granulated and cooled. The natural fiber length is greatly shortened during this process and is firmly bound with the polymer with the aid of the adhesive promoter. For example, DE 10 2008 046 770 A1 discloses a method of this type.

It is generally customary for processing in injection molding machines first to use the extruder to produce a granular plastic material that is introduced to the injection molding machine immediately or following an additional pelletizing step. During extrusion, the fiber lengths of the natural fibers are shortened to such an extent (to 1-3 mm) that these can be processed in the injection molding machine without the risk of clogging the nozzle. In addition, the maximum upper limit for natural fibers in injection molding was 45 wt.-% for the sake of practical processing. At fractions above this, the risk of clogging is particularly high, causing considerable, cost-intensive damage. The use of an adhesive promoter may mean that the friction produced by the long fibers in the extruder of the injection molding machine is so greatly increased that blocking, or in extreme cases, destruction, of the hot-runner in the injection molding tool can take place.

However, the drawback of the pronounced shortening for the component to be manufactured is that the mechanical properties of the material are generally affected negatively. For example, fracture edges in plastic parts with short fiber lengths, which are rigidly bound in the plastic die, are distinctly sharper than when longer fibers are used. However, this is accepted for the sake of workability of the granular material.

For example, a pultrusion method is known from the prior-art document DE 10 2011 116 397 A1 in which a continuous fiber bundle is impregnated with resin. This method is a hot method in which fiber bundles are passed through a crosshead of an extruder, surrounded with molten resin and thus become thermal. The heat exposure already takes place in the extruder. The fibers in the pellet produced extend exclusively in the longitudinal direction and essentially in parallel. The fibers in the pellet produced extend exclusively in the longitudinal direction and essentially parallel. The process is labor-intensive and thus expensive.

The fiber materials used to date include among other things wood fibers, flax fibers, sisal fibers and hemp fibers.

The invention is based on the problem of providing a manufacturing method for natural fiber-reinforced plastic parts with longer natural fibers compared to the prior art, without the addition of adhesive promoters for processing in injection molding.

This problem is solved with the combination of features from claim 1. Here, a method for producing a natural fiber-reinforced plastic part is provided, in which the starting materials used are 5-120 mm long natural fibers, especially 50-100 mm, a thermoplastic (e.g., PP) and/or duroplastic material and a lubricant, especially wax, is pelletized by cold-forming without extrusion into long-fiber pellets, and the long-fiber pellets can then be processed directly in a standard injection molding machine, wherein they are fed to the standard injection molding machine to extrude the plastic part.

The long natural fibers in the plastic create higher rigidity and strength. Feeding in the starting material consisting of thermoplastic and/or duroplastic with natural fibers in cold-formed pelleted form supports without their first passing through an extrusion process for compounding is advantageous in that less shortening of the fibers takes place. During pelletizing, the fibers are shortened to a specified maximum length.

In the present context, cold forming is defined as forming in a temperature range of 25° C.-85° C. The first action of heat on the materials of the pellet that is greater than the meting point of the die material does not already take place in an upstream extruder, as in the prior art, but only in the injection molding machine.

The starting material used is free from chemical binders; only the thermoplastic and/or duroplastic, the lubricant and the natural fibers are used for pellet production.

The use of wax instead of a conventional adhesive promoter offers the advantage that the natural fibers can move freely during processing in the injection molding machine due to the low melting point of the wax in the melt and thus will not be shortened as greatly. In addition, the wax supports the linking of the natural fibers during injection molding, so that the fiber distribution in the component is considerably more uniform. The wax used may be, for example, polyethylene wax.

According to the invention, preferably natural fibers made from retted hemp, retted flax or bamboo.

Advantageously the natural fibers in the long-fiber pellets after cold forming have a length of 5-40 mm, more preferably 5-30 mm, more preferably 5-16 mm. After the processing of the pellets in the injection molding and the injection molding of the plastic part it is provided that the preferably 5-16 mm long natural fibers subsequently in the injected plastic part still have a length of 5-14 mm. This benefits, in particular, the mechanical properties of the component part. Thus compared to the known method, a distinct prolongation of the natural fiber length in the finished component part is achieved, since previous fiber lengths in the final component part usually are no longer than 3 mm.

In pelletization it is preferred for the natural fibers in the long-fiber pellets to undergo only a single change in orientation, wherein the natural fibers are turned once and their total length in the pellet doubles. From the practical viewpoint, the natural fibers are introduced in the longitudinal direction to the longitudinal axis of the cylindrical pellet, and turned around once through about 180 degrees, so that they essentially extend in a U shape within the longitudinal axis of the pellet.

The long fiber pellets produced preferably have a length of 5-30 mm and a diameter of 4-7 mm.

The change in direction or turning around of the fibers is achieved by pellet manufacturing with a pelletizer die. In this process it is intended for fibers to be introduced to the pelletizing process as loose material and the thermoplastic or duroplastic in a specified weight distribution, wherein the thermoplastic or duroplastic is present in the form of a micro-granulate with a diameter of 1-3 mm.

To achieve the desired size of the pellets according to the invention, a pelletizer die with an opening diameter of 5 mm to 6 mm is used.

The pre-specified weight distribution is set as a weight distribution of 50% to 55% natural fibers and 45% to 50% thermoplastic and wax or additive.

When a flat die press is used as the pelletizer die for pellet production, the thermoplastic in the form of a micro-granular material acts as an intake aid for the natural fiber into the holes in the die. This means that the natural fibers lying loose in the pelletizer die undergo bending due to the granulate component parts upon entering the hole. In the present context, a "microgranulate" is defined as a particle size with a diameter of less than 3 mm. The non-pretreated natural fiber, especially hemp and flax, permits bending of more than 180° with a bending radius of less than 3 mm, so that upon entry into the pelletizer die it can be bent along it's the granule surface by the microgranulate. Materials that do not fulfill these requirements, for example bamboo fibers, are ground fine in the flat die press, as takes place in the prior art when extruders are used.

Using the method of the invention, a large number of natural fibers can be arranged side by side within the long-fiber pellets and the total fraction in wt.-% can be established at more than 50% without the fibers clogging the nozzle. In the method according to the invention it is advantageous for the natural fibers to become linked during the injection molding, and thus improve the mechanical properties of the component part being produced. The fiber length in connection with a fiber filling degree of more than 50% results in a mat-like fiber structure in the finished component part. As a result of the mechanical interlocking or enlacement, the mechanical values and the impact strength are distinctly increased. If the component part breaks, the polar longitudinal fibers are pulled out of the nonpolar matrix without creating a sharp fracture site. Thus the component part can absorb distinctly higher impact forces.

In one embodiment of the invention, additives, especially lubricants, colorants and/or natural fillers are added to the long fiber pellets to adjust the processability, mechanical properties or appearance.

It is intended according to the invention that the fraction of natural fibers should amount to at least 50 wt.-%, the fraction of thermoplastic and/or duroplastic materials a maximum of 48 wt.-% and the fraction of wax at least 2 wt.-%. To be sure, it is described in the prior art that natural fiber fractions of more than 50% are used, but such compositions with fiber lengths of greater than 3 mm cannot be processed by injection molding. Actually the natural fiber fraction for processing of plastics in granular form in injection molding machines is currently limited to a maximum of 45%. As a result of the mechanical pelletization and the alignment of the natural fiber in the pellet, the fraction can be distinctly increased.

In embodiments of the invention it is provided that the thermoplastics are selected from the group of the polyolefins, especially polypropylene, blend systems and biological plastics.

In addition, component arts can be produced with the method of the invention in which a two- or three-dimensional decorative surface of the plastic component is directly back-injection molded. In this process, connecting elements or fastening elements may be injected at the same time. The decorative component can therefore be produced in a single working pass.

Other advantageous further developments of the invention are characterized in the dependent claims. However, the invention is not limited in its execution to the above-named preferred examples. Instead, a number of variants are conceivable, which make use of the solution presented even with very different models. For example, it is possible to mix various types of natural fibers or adapt the pellet size to further increase the fiber lengths.

The attached FIGS. 1a-1c present schematic examples of the cold-forming pelletization process and a cold-formed pellet for subsequent feed into a conventional injection molding machine.

In FIG. 1a, a schematic top view of a flat die press having numerous holes 10 is shown. Natural fibers 20 are laid in the flat die press and extend beyond marginal sections of the holes 10. In addition, thermoplastic and/or duroplastic material in the form of microgranulate 30 is introduced, so that a haphazard mixture of natural fibers 20 and micro-granulate 30 is present. Using a male die part (not shown), the natural fibers 20 and the microgranulate 30 are pressed through the holes 10 according to the schematic side view according to FIG. 1b, wherein the microgranulate 30 partially surrounds the natural fibers 20 and produces bending of the natural fibers 20 encompassed by microgranulate 30 of up to 180°. The microgranulate 30 acts as a feed aid for the natural fibers 20 into the respective hole 10 of the pelletizing die. The process takes place under cold conditions without active introduction of heat. A pellet 40 pressed out of the holes 10, with microgranulate 30 and natural fibers distributed haphazardly therein, is shown in FIG. 1c. The total fiber length of the natural fibers 20 in the pellet 40 produced can be distinctly increased by the bend up to as much as 40 mm. The pellet 40 is introduced to an injection molding machine and the plastic part to be created is molded by injection. The natural fibers subsequently still have a measurable length of 5-14 mm in the injection molded plastic part.

What is claimed is:

1. A method for producing a natural fiber-reinforced plastic part, wherein as the starting material natural fibers 5-120 mm in length as loose material, a thermoplastic and/or a duroplastic and a lubricant are pelletized without extrusion into long-fiber pellets by cold-forming at a temperature ranging from 25-85° C. and the long-fiber pellets are then fed, without mixing, for processing into an injection molding machine for injecting the plastic part.

2. The method according to claim 1, wherein said lubricant is wax.

3. The method according to claim 1, wherein the natural fibers are distributed in the long-fiber pellets, undergo at least one direction-changing bending during cold forming, and have a length of 5-40 mm.

4. The method according to claim 1, wherein the starting material is binder-free.

5. The method according to claim 1, wherein the long-fiber pellets have a length of 5-30 mm and a diameter of 4-7 mm.

6. The method according to claim 1, wherein the natural fibers and the thermoplastic and/or duroplastic and the lubricant are fed into a pelletization die and pressed through under cold forming, wherein the natural fibers are bent by the pelletizing die and in the long fiber pellet produced have a total length that is greater than the length of the long-fiber pellet.

7. The method according to claim 6, wherein said lubricant is wax.

8. The method according to claim 6, wherein the thermoplastic and/or the duroplastic and the lubricant are formed as a granular material with a diameter of 1-3 mm.

9. The method according to claim 1, wherein additives are added to the long-fiber pellets.

10. The method according to claim 9, wherein said additives are selected from the group consisting of lubricant, colorant and natural fillers.

11. The method according to claim 1, wherein the plastic part is molded by injection molding.

12. The method according to claim 11, wherein the natural fibers are linked during the injection molding.

13. The method according to claim 1, wherein in the starting material the fraction of natural fibers is greater than 50 wt.-%, the fraction of thermoplastic and/or duroplastic is a maximum of 48 wt.-% and the fraction of lubricant is at least 2 wt.-%.

14. The method according to claim 1, wherein the thermoplastics are selected from the group of polyolefins blended systems and plastics based on renewable raw materials.

15. The method according to claim 14, wherein said polyolefin is polypropylene.

16. The method according to claim 1, wherein a two- or three-dimensional decorative surface of the plastic part is directly back injection molded.

17. A plastic part produced according to the method of claim 1.

* * * * *